United States Patent
Munteanu

(10) Patent No.: US 10,776,076 B2
(45) Date of Patent: *Sep. 15, 2020

(54) NEURAL NETWORK ENGINE

(71) Applicant: FotoNation Limited, Galway (IE)

(72) Inventor: Mihai Constantin Munteanu, Brasov (RO)

(73) Assignee: FotoNation Limited, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/783,984

(22) Filed: Feb. 6, 2020

(65) Prior Publication Data

US 2020/0249911 A1 Aug. 6, 2020

Related U.S. Application Data

(63) Continuation of application No. 15/955,426, filed on Apr. 17, 2018, now Pat. No. 10,558,430.

(51) Int. Cl.
*G06F 7/487* (2006.01)
*G06F 17/15* (2006.01)
(Continued)

(52) U.S. Cl.
CPC ............ *G06F 7/4876* (2013.01); *G06F 17/15* (2013.01); *G06N 3/04* (2013.01); *G06N 5/046* (2013.01)

(58) Field of Classification Search
CPC .......... G06N 3/04; G06N 3/063; G06F 7/026; G06F 7/485; G06F 7/4876; G06F 7/5443; G06F 7/575
See application file for complete search history.

(56) References Cited

U.S. PATENT DOCUMENTS 6,157,751 A  12/2000 Olson et al.
2016/0292566 A1  10/2016 Duranton et al.
(Continued)

FOREIGN PATENT DOCUMENTS

WO  2016083002 A1  6/2016
WO  2017129325 A1  8/2017
WO  2018035508 A1  2/2018

OTHER PUBLICATIONS

Dias F M et al: "Artificial neural networks: a review of commercial hardware", Engineering Applications of Artificial Intelligence, Pineridge Press, Swansea, GB, vol . 17, No. 8,Dec. 1, 2004 (Dec. 1, 2004), pp. 945-952, XP004656068, ISSN: 0952-1976, DOI: 10.1016/J.ENGAPPAI.2004.08.011.
(Continued)

*Primary Examiner* — Andrew Caldwell
*Assistant Examiner* — Emily E Larocque
(74) *Attorney, Agent, or Firm* — Lee & Hayes, PC

(57) ABSTRACT

A neural network engine comprises a plurality of floating point multipliers, each having an input connected to an input map value and an input connected to a corresponding kernel value. Pairs of multipliers provide outputs to a tree of nodes, each node of the tree being configured to provide a floating point output corresponding to either: a larger of the inputs of the node; or a sum of the inputs, one output node of the tree providing a first input of an output module, and one of the multipliers providing an output to a second input of the output module. The engine is configured to process either a convolution layer of a neural network, an average pooling layer or a max pooling layer according to the kernel values and whether the nodes and output module are configured to output a larger or a sum of their inputs.

20 Claims, 12 Drawing Sheets

(51) Int. Cl.
*G06N 3/04* (2006.01)
*G06N 5/04* (2006.01)

(56) References Cited

U.S. PATENT DOCUMENTS

2017/0011006 A1  1/2017  Saber et al.
2017/0221176 A1  8/2017  Munteanu et al.
2018/0046903 A1  2/2018  Yao et al.

OTHER PUBLICATIONS

Porrmamn et al: "Implementation of artificial neural networks on a reconfigurable hardware accelerator", Parallel, Distributed and Network-Based Processing 2002. Proceedings.10th Euromicro Workshop on Canary Islands,Spain Jan. 9-11, 2002, Los Alamitos, CA USA, IEEE Comput. Soc, US, Jan. 9, 2002 (Jan. 9, 2002), pp. 243-250, XP010587926, DOI: 10.1109/EMPDP.2002.994279, ISBN: 978-0-7695-1444-4.
Antony W Savich, et al: "The Impact of Arithmetic Representation on Implementing MLP-BP on FPGAs: A Study", IEEE Transaction on Neural Networks, IEEE Service Center , Piscataway, NJ, US, vol. 18, No. 1, Jan. 1, 2007 (Jan. 1, 2007), pp. 240-252, XP011152917, ISSN: 1045-9227, DOI:10.1109/TNN.2006.883002.
International Search Report and Written Opinion of International Application No. PCT/EP2016/081776 filed Dec. 19, 2016, entitled "A Convolutional Neural Network", Report completed Feb. 27, 2017, dated Mar. 3, 2017.
Chen Pei-Yin et al: "An Efficient Hardware Implementation of HOG Feature Extraction for Human Detection" IEEE Transactions on Intelligent Transportation Systems IEEE, Piscataway, NJ, USA, vol. 15, No. 2, Apr. 1, 2014 (Apr. 1, 2014), pp. 656-662, XP011544599, ISSN: 1524-9050, DOI: 10.1109/TITS.2013.2284666.
Niklas Pettersson et al: "The histogram feature—a resource-efficient Weak Classifier", Intelligent Vehicles Symposium, 2008 IEEE, IEEE, Piscataway NJ, USA, Jun. 4, 2008 (Jun. 4, 2008), pp. 678-683, XP031318819, ISBN: 978-1-4244-2568-6.
Tam Phuong Cao et al: "Real-Time Vision-Based Stop Sign Detection System on FPGA". Computing: Techniques and Applications, 2008. DICTA '0 8.Digital Mage ,IEEE, Piscataway NJ, USA, Dec. 1, 2008 (Dec. 1, 2008), pp. 465-471, XP031371914, ISBN: 978-0-7695-3456-5.
Dalal N et al: "Histograms of Oriented Gradients for Human Detection", Proceedings/ 2005 IEEE Computer Society Conference on Computer Vision and Pattern Recognition, CVPR 2005 : [Jun. 20-25, 2005, San Diego, CA], IEEE, Piscataway, NJ, USA, vol. 1, Jun. 20, 2005 (Jun. 20, 2005), pp. 886-893, XP010817365, DOI: 10.1109/CVPR.2005.177 ISBN: 978-0-7695-2372-9.
Sebastian Bauer et al: "FPGA Implementation of a HOG-based Pedestrian Recognition System FPGA Implementation of a HOG-based Pedestrian Recognition System", MPC Workshop, Jul. 1, 2009 (Jul. 1, 2009), pp. 1-10, XP055241059, Retrieved from the Internet: URL:http://www5.informatik.uni-erlangen.de/Forschung/Publikationen/2009/Bauer09-FIO.pdf [retrieved on Jan. 13, 2016].
John-Olaf Nilsson: "Efficient implementation of data binning in sectors", X Technical Report: TRITA-EE2 012:041,Jan. 1, 2012 (Jan. 1, 2012), pp. 1-33, XP055240925, Stockholm Retrieved from the Internet: URL:http://www.diva-portal.org/smash/get/diva2:548677/FULLTEXT01.pdf [retrieved on Jan. 13, 2016].
Kazuhiro Negi et al: "Deep pipelined one-chip FPGA implementation of a real-time image-based human detection algorithm", Field-Programmable Technology (FPT), 2011 International Conference on, IEEE, Dec. 12, 2011 (Dec. 12, 2011), pp. 1-8, XP032096830, DOI: 10.1109/FPT.2011.6132679 ISBN: 978-1-4577-1741-3.
International Search Report and Written Opinion of International Application No. PCT/EP2015/073058 filed Oct. 6, 2015, entitled "A Method for Producing a Histogram of Oriented Gradients", Report completed Jan. 15, 2016, dated Mar. 7, 2016.
IEEE Computer Society,"IEEE Standard for Floating-Point Arithmetic", IEEE Std 754™—2008, (Revision of IEEE Std 754-1985), IEEE 3 Park Avenue New York, NY 10016-5997, USA, Aug. 29, 2008, 70 pages.
Specifications for European Application No. 19159963.8, "A neural network engine," filed on Feb. 28, 2019, FotoNation Limited, 15 pages.
The European Search Report dated Aug. 23, 2019, for European Patent Application No. 19159963.8-1221, 11 pages.
Li, et al., "A survey of neural network accelerators," Front. Comput. Sci., vol. 11, No. 5, 2017, pp. 746-761, 16 pages.
3. Kolinummi, et al., PARNEU; General-purpose partial tree computer, Microprocessors and Microsystems 24, p. 23-42, 2000 (Year: 2000).
T. Hamalainen, et al., TUTNC: A general purpose parallel computer for neural network computations, Microprocessors and Microsystems, vol. 19, No. 8, 1995 (Year: 1995).
A Maashri, Accelerating Design and Implementation of Embedded Vision Systems, The Penn. State University, Dissertation, 2012 (Year: 2012).

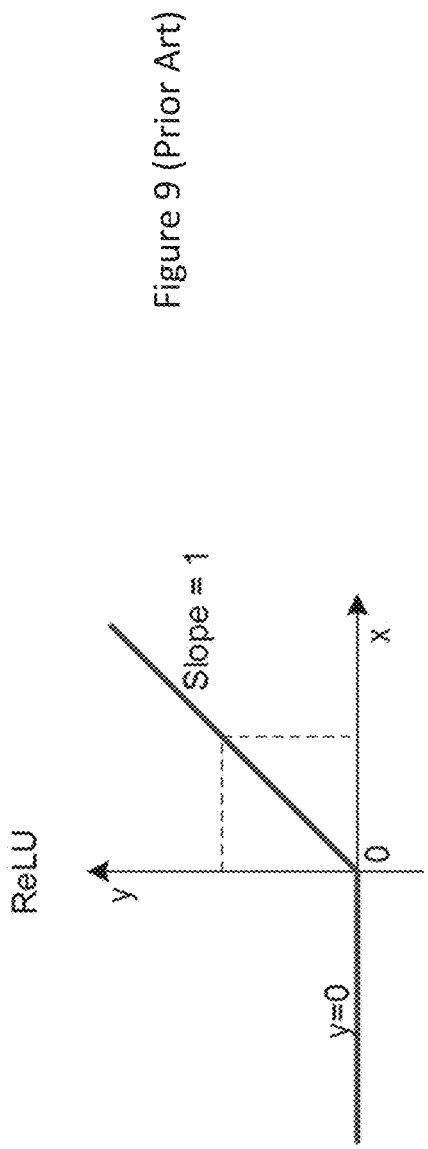
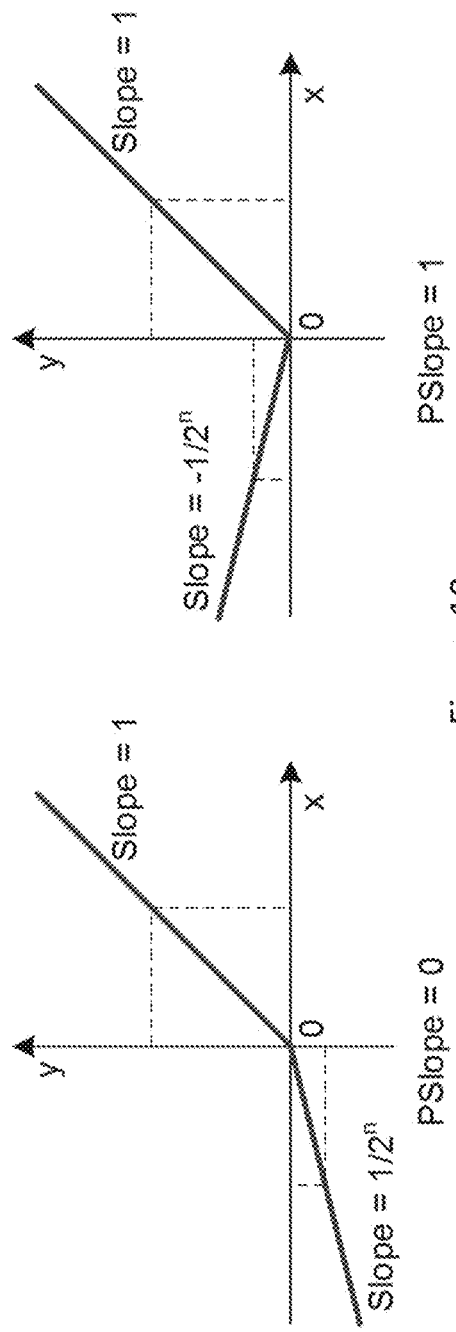
Figure 9 (Prior Art)
Figure 10

Figure 12 (Prior Art)

NEURAL NETWORK ENGINE

CROSS-REFERENCE TO RELATED APPLICATIONS

This application is a continuation of U.S. application Ser. No. 15/955,426 filed Apr. 17, 2018, which application relates to International PCT Application No. PCT/EP2016/081776 (Ref: FN-481-PCT), the disclosures of which are incorporated herein by reference in their entireties.

FIELD

The present invention relates to a neural network engine.

BACKGROUND

A processing flow for typical Convolutional Neural Network (CNN) is presented in FIG. 1. Typically, the input to the CNN is at least one 2D image/map 10 corresponding to a region of interest (ROI) from an image. The image/map(s) can comprise image intensity values only, for example, the Y plane from a YCC image; or the image/map(s) can comprise any combination of colour planes from an image; or alternatively or in addition, the image/map(s) can contain values derived from the image such as a Histogram of Gradients (HOG) map as described in PCT Application No. PCT/EP2015/073058 (Ref: FN-398), the disclosure of which is incorporated by reference, or an Integral Image map.

CNN processing comprises two stages:

Feature Extraction (12)—the convolutional part; and
Feature classification (14).

CNN feature extraction 12 typically comprises a number of processing layers 1 ... N, where:

Each layer comprises a convolution followed by optional subsampling (pooling);
Each layer produces one or (typically) more maps (sometimes referred to as channels);
The size of the maps after each convolution layer is typically reduced by subsampling (examples of which are average pooling or max-pooling);
A first convolution layer typically performs 2D convolution of an original 2D image/map to produce its output maps, while subsequent convolution layers perform 3D convolution using the output maps produced by the previous layer as inputs. Nonetheless, if the input comprises say a number of maps previously derived from an image; or multiple color planes, for example, RGB or YCC for an image; or multiple versions of an image, then the first convolution layer can operate in exactly the same way as successive layers, performing a 3D convolution on the input images/maps.

FIG. 2 shows an example 3D convolution with a 3×3×3 kernel performed by a subsequent feature extraction convolution layer of FIG. 1. The 3×3×3 means that three input maps A, B, C are used and so, a 3×3 block of pixels from each input map is needed in order to calculate one pixel within an output map.

A convolution kernel also has 3×3×3=27 values or weights pre-calculated during a training phase of the CNN. The cube 16 of input map pixel values is combined with the convolution kernel values 18 using a dot product function 20. After the dot product is calculated, an activation function 22 is applied to provide the output pixel value. The activation function 22 can comprise a simple division, as normally done for convolution, or a more complex function such as sigmoid function or a rectified linear unit (ReLU) activation function of the form: $y_j = h(x_j) = \max(0, x_j)$ as typically used in neural networks.

In this case, for 2D convolution, where a single input image/map is being used, the input image/map would be scanned with a 3×3 kernel to produce the pixels of a corresponding output map.

Within a CNN Engine such as disclosed in PCT Application No. PCT/EP2016/081776 (Ref: FN-481-PCT) a processor needs to efficiently implement the logic required to perform the processing of different layers such as convolution layers and pooling layers.

SUMMARY

According to the present invention there is provided a neural network engine according to claim 1.

Embodiments of the present invention incorporate a module for outputting floating point results for pooling or convolution layer operations in a neural network processor.

By sharing the resources needed for both layer types, the processing pipeline within the neural network engine can be kept simple with the number of logic gates as low as possible.

BRIEF DESCRIPTION OF THE DRAWINGS

Embodiments of the invention will now be described, by way of example, with reference to the accompanying drawings, in which:

FIG. 9 illustrates a conventional ReLU activation function;
FIG. 10 illustrates a PReLU activation function implemented by an embodiment of the present invention;
FIG. 12 illustrates a conventional PEAK operation.

DETAILED DESCRIPTION OF THE EMBODIMENTS

A floating point (FP) representation is usually employed for both the convolution kernel weights and image/map values processed by a CNN engine. A typical format suited for a hardware CNN engine implementation is 16 bit, half precision floating point (IEEE 754-2008). However, 8-bit FP representations can also be used and PCT Application No.

PCT/EP2016/081776 (Ref: FN-481-PCT) discloses how a default FP exponent bias can changed to a custom value to avoid needing to use higher precision FP formats.

Figure 3:
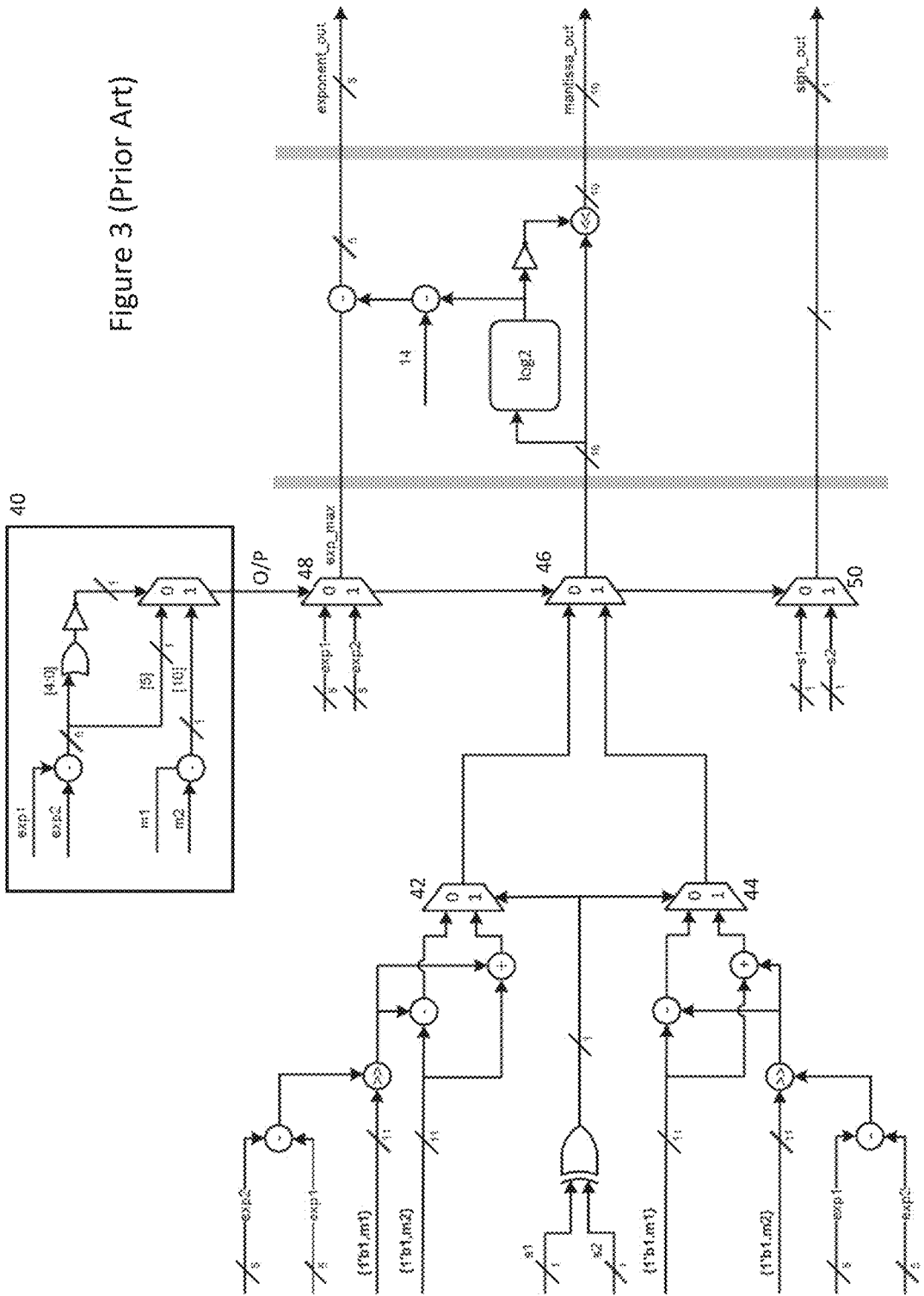
FIG. 3 shows a typical floating point adder.

FIG. 3 shows an exemplary conventional 16 bit FP (IEEE 754-2008) floating point adder—clearly this structure is similar for any precision. As is known, such an adder must know which of two operands comprising s1/exp1/m1 and s2/exp2/m2 respectively is larger in order to align the mantissa of the operands. Thus, the adder shown includes a comparator 40 producing a binary output (O/P) indicating which of the floating point operands is larger.

The sign bits s1,s2 of these operands are in turn used through multiplexer 42 to select between a version of m1 shifted according to the difference between exp2 and exp1 subtracted from m2; or the shifted version of m1 added to m2; and through multiplexer 44 to select between a version of m2 shifted according to the difference between exp2 and exp1 subtracted from m1; or the shifted version of m2 added to m1. Now using multiplexers 46, 48 and 50 depending on the output O/P of the comparator 40, the output of either multiplexer 42 or 44 is chosen to generate the mantissa for the output of the adder, the value of the mantissa is also used to adjust whichever of exp1 or exp2 are selected by multiplexer 48 to generate the exponent for the output of the adder, while the sign for the output of the adder is chosen as either s1 or s2.

Note that this adder is shown for exemplary purposes only and the present invention is equally applicable to any equivalent floating point adder.

Figure 1:
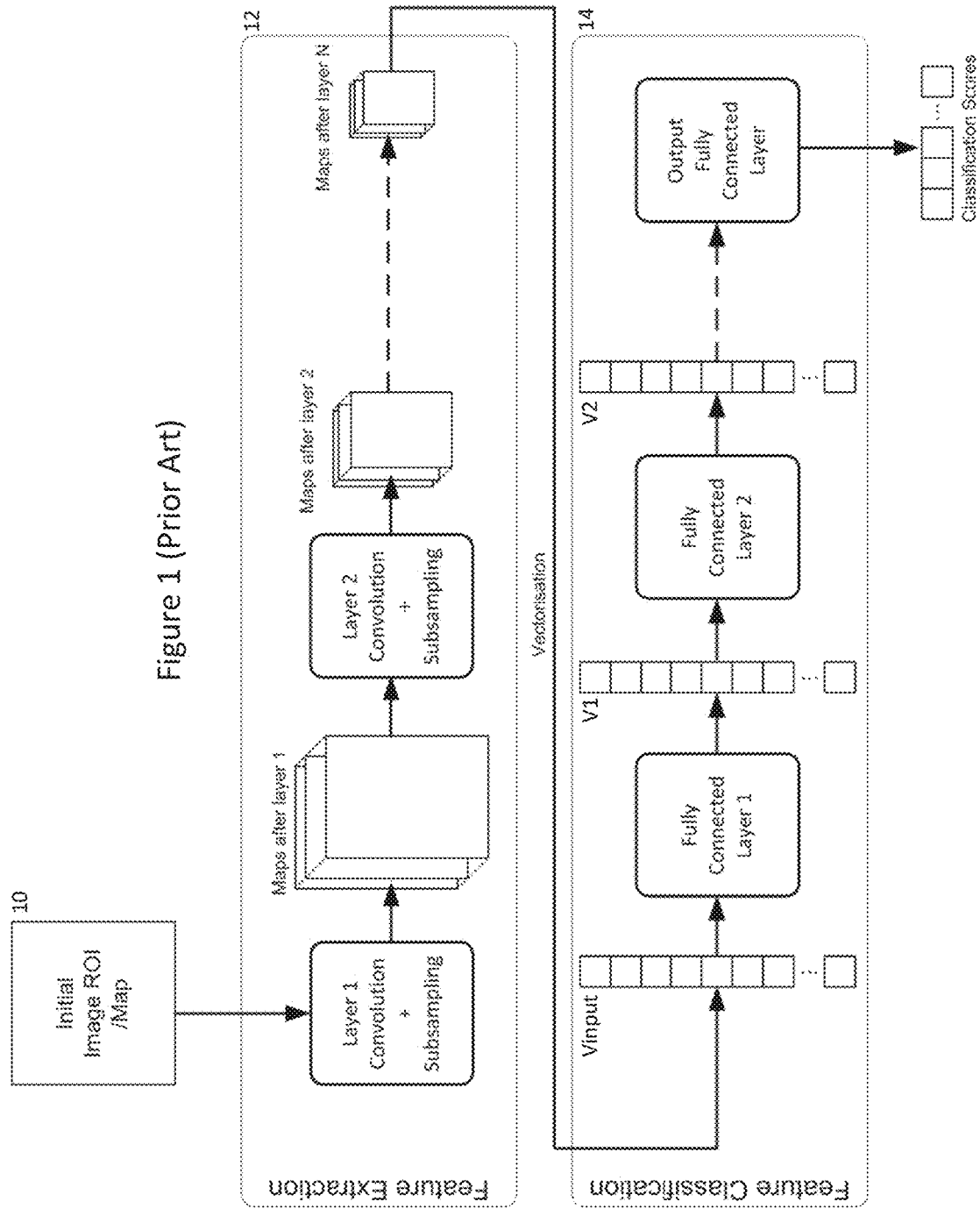
FIG. 1 shows a typical Convolutional Neural Network (CNN)
Figure 2:
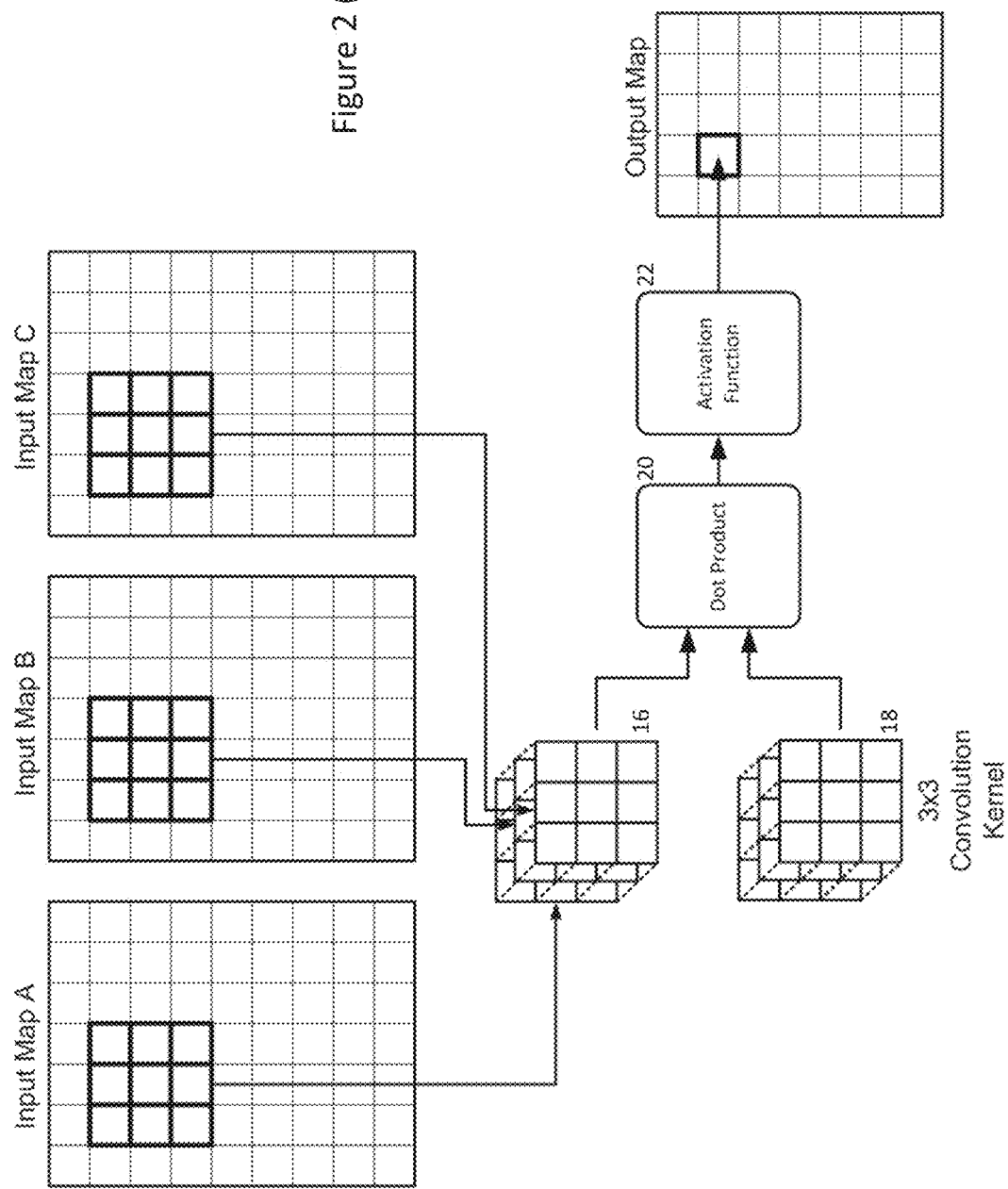
FIG. 2 shows an exemplary 3D Convolution with a 3×3×3 kernel.
Figure 4:
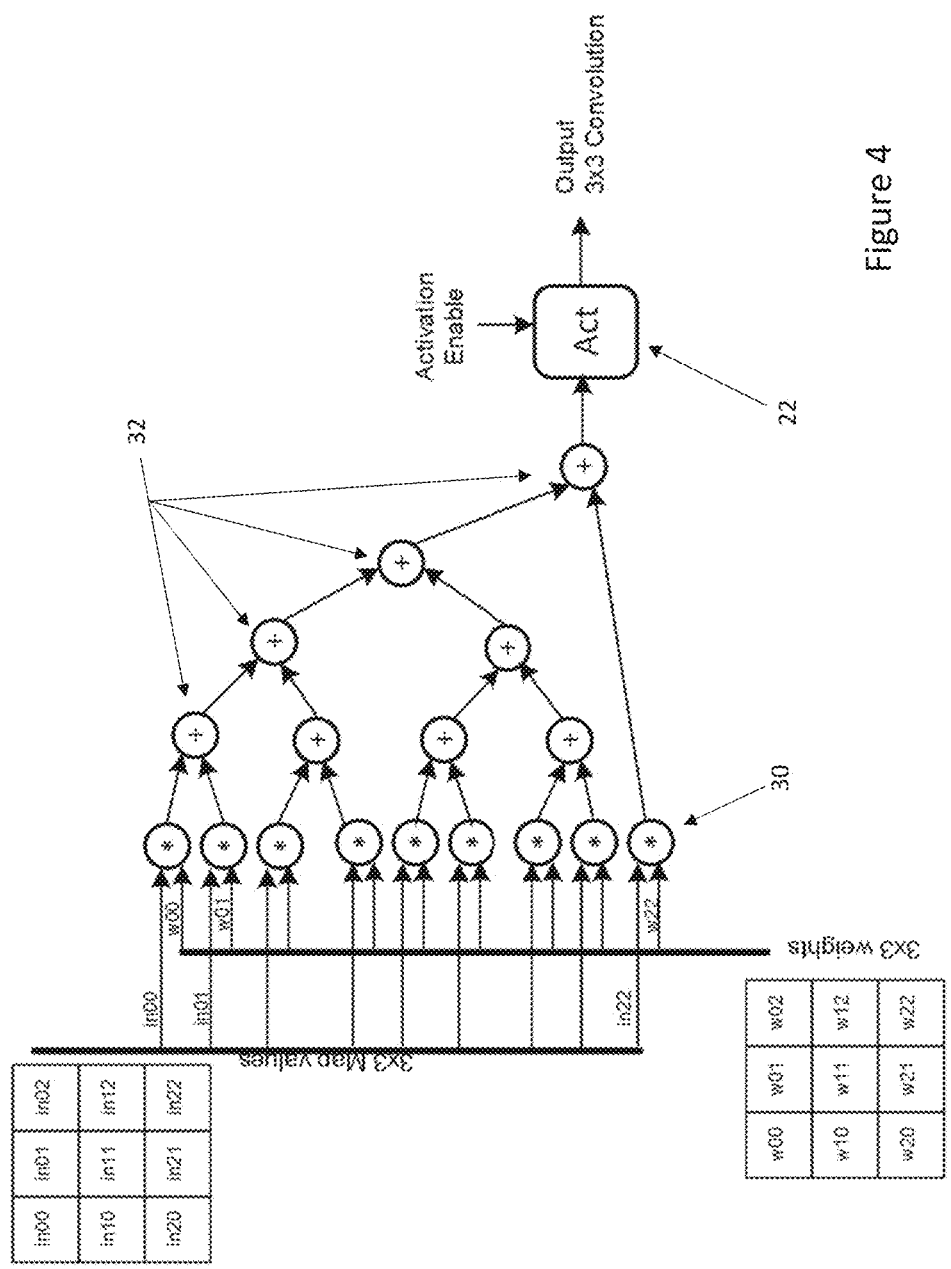
FIG. 4 shows a tree for implementing 3×3 convolution kernel.

Referring now to FIG. 4, it will be seen that convolution layers need: logic implementing floating point multipliers (30) and adder logic (32) to implement the dot product function (20) shown in FIG. 2 as well as logic for the activation function (22). Note that any 3D convolution layers can be broken into a longer chain of multipliers whose products are then added in a deeper tree than shown. Thus, the 3×3×3 convolution shown in FIG. 2 might require 27 multipliers. The logic shown in FIG. 4 can therefore be expanded to deal with the largest form of convolution to be performed by a given CNN engine and where smaller or simpler 2D convolutions are to be performed, then for example, selected non-active weights within the kernel can be zeroed.

Figure 5:
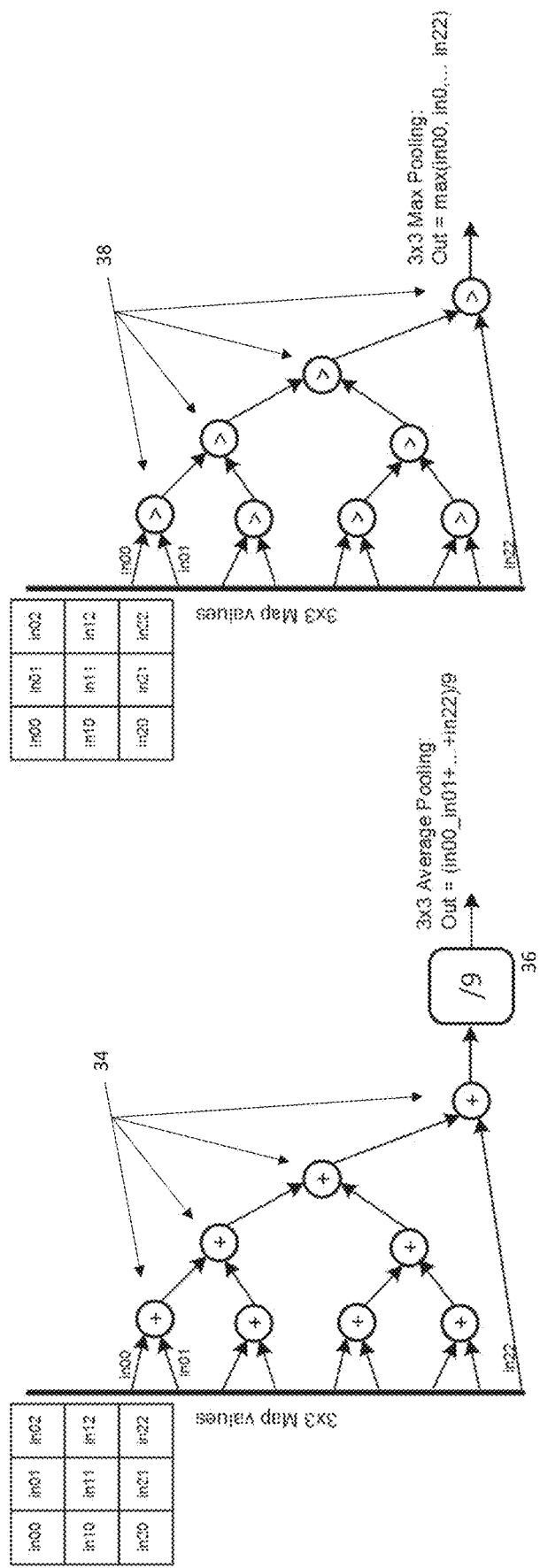
FIGS. 5(a) and (b) show trees for 3×3 average and maximum pooling respectively.

Separately, FIG. 5(*a*) shows that average pooling layers need: adders (34) as well as logic (36) for implementing a multiplication by 1/kernel size; while FIG. 5(*b*) shows that maximum pooling layers need comparators (38).

Looking at the trees of FIGS. 4 and 5, it will be seen that the adder (32, 34) and comparator (38) trees have similar structures with each node in a tree either producing a sum of its inputs or a maximum of its inputs respectively.

It will also been seen that any floating point adder such as the adder of FIG. 3 already comprises comparator circuitry 40 for determining which of its operands is larger. Thus, with little additional configuration circuitry, any such adder can be converted to either select the sum of its input operands (as normal) or the larger of the operands fed to the comparator based on a single control input. The logic paths producing these results are separate and so this functionality can be implemented without effecting the timing of the adder.

Figure 6:
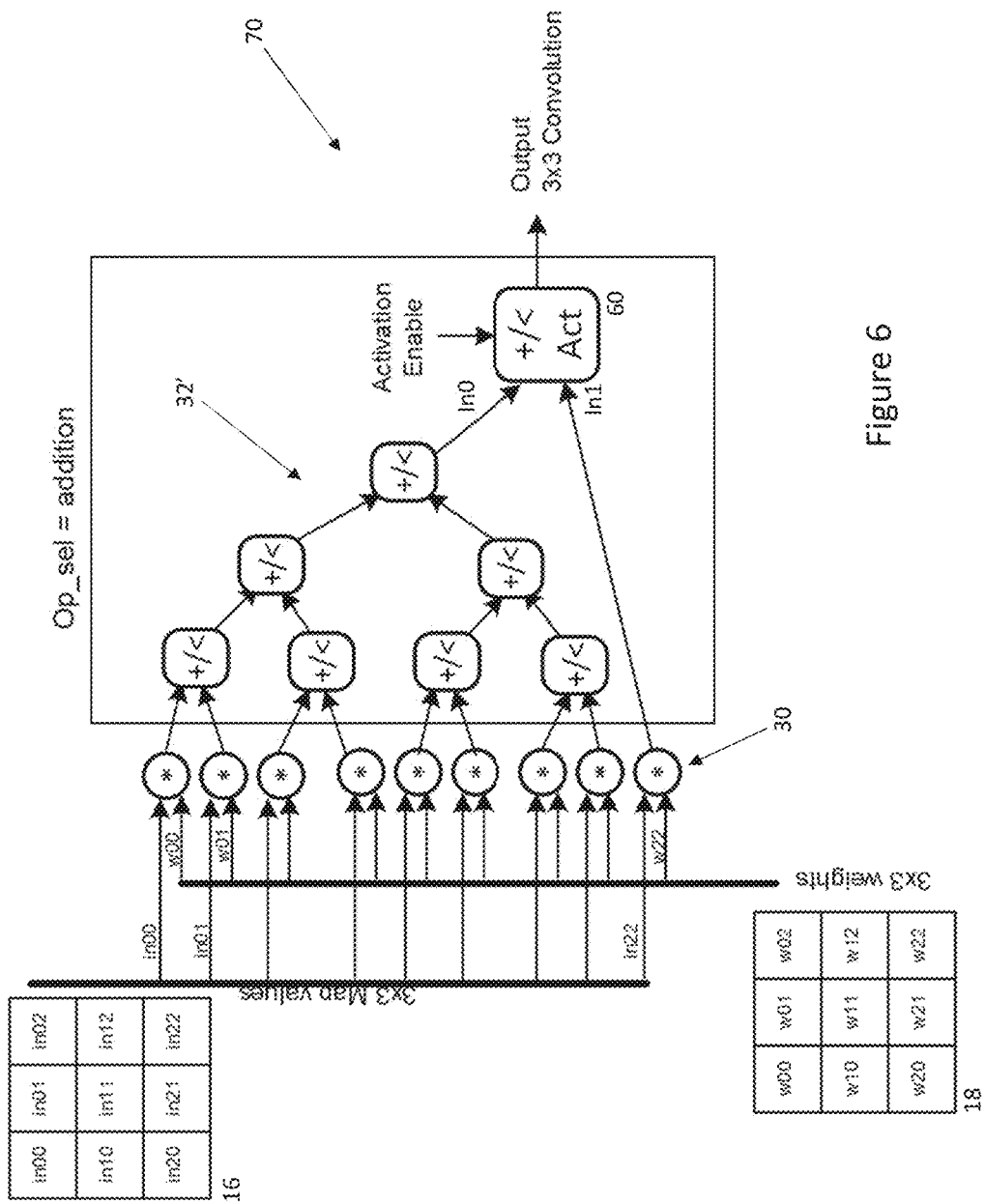
FIG. 6 shows processing logic configured for implementing a convolutional network layer according to an embodiment of the present invention.

Referring now to FIG. 6, there is shown circuitry 70 for enabling a CNN engine to process either a convolutional, max pooling or average pooling layer of a neural network according to an embodiment of the present invention. The circuitry 70 comprises a first layer of conventional floating point multipliers 30 such as are shown in FIG. 4. Now instead of a tree of floating point adder nodes 32 as shown in FIG. 4, there is provided a tree 32' of configurable nodes which can be set to either produce a sum of their inputs or a maximum of their inputs according to the value of an Op_sel control input.

In the embodiment, the output of the final node in the tree 32' and an output of one of the multipliers 32 are fed to an output module 60 as In0 and In1 respectively.

The circuitry 70 is configured to operate in a number of different modes:

In FIG. 6, the tree 32' is configured for 3×3 2D convolution by having the nodes perform addition i.e. Op_sel is set to indicate addition and fed to each node. Now trained weight values 18 for a kernel are combined with input image/map values 16 typically surrounding a given pixel corresponding to in11 in the multipliers 30 as required, before being fed through the tree 32' to the output module 60. An activation function enable signal is fed to the output module 60 and this will cause the output module 60 to apply a required activation function to the result of an operation on In0 and In1 determined according to the value of Op_sel, in this case addition, as will be explained in more detail below, before providing the convolution output for the given pixel of the input image/map.

Figure 7:
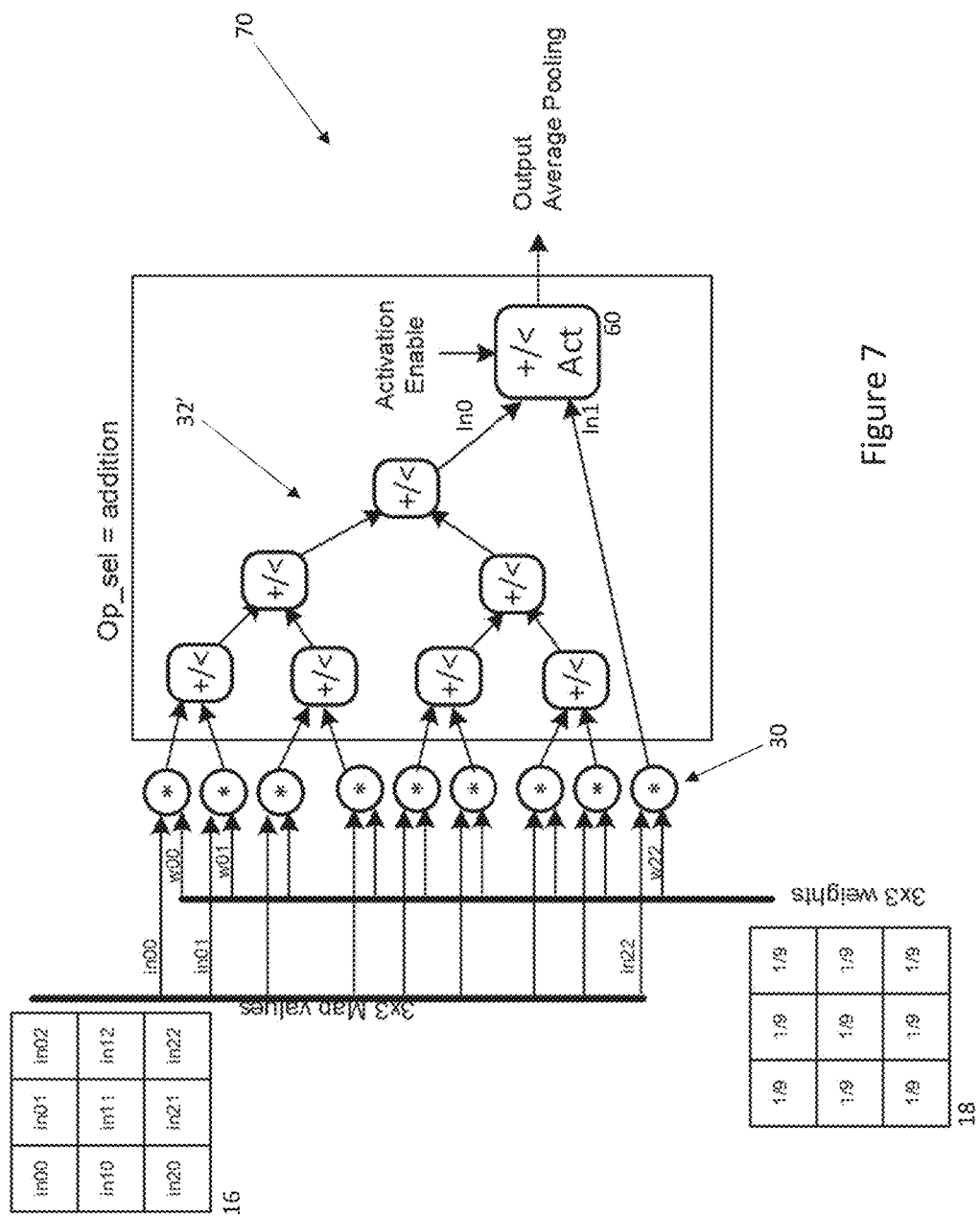
FIG. 7 shows the processing logic of FIG. 6 configured for implementing an average pooling layer.

FIG. 7 shows that the same tree 32' can configured for average pooling by setting the weight values 18 in the kernel to 1/9, where 9 is the number of (active) cells in the kernel, and having the nodes in the tree 32' configured to perform addition. In this case, the output module 60 simply needs to add In0 and In1 to provide its output according to the value of Op_sel. Thus, no activation function (or a simple identity function) need only be applied to the operational result of In0, In1.

Figure 8:
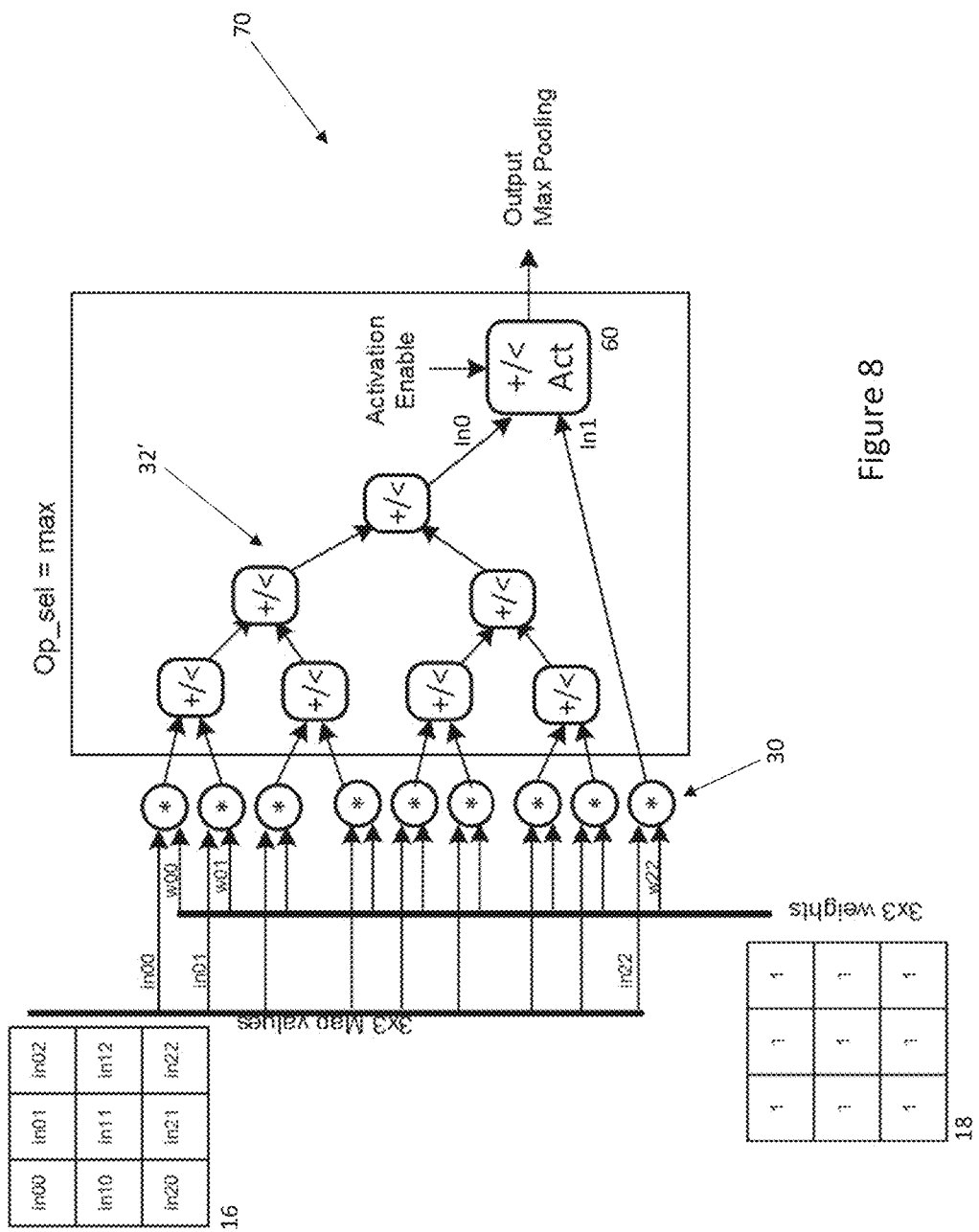
FIG. 8 shows the processing logic of FIG. 6 configured for implementing a max pooling layer.

Finally, FIG. 8 shows that the same tree 32' can be configured for max pooling by setting the (active) weight values 18 in the kernel to 1 and having the nodes in the tree 32' configured as comparators only to produce a maximum of their operands. In this case, the output module 60 simply needs to select the larger of In0 and In1 as its output according to the value of Op_sel. Again, no activation function (or a simple identity function) need only be applied to the operational result of In0, In1.

Again, the trees presented here are just an example for 3×3 kernels. Other kernel sizes can be easily implemented.

As indicated, convolution needs an activation function 22 to be applied to the dot product 20 of the input image/map values 16 and weight kernel values 18. Currently, the most used activation function are Identity function i.e. no activation function is applied, ReLU and PReLU.

As shown in FIG. 9, ReLU (Rectified Linear Unit), a very simple function, is defined as follows:

$ReLU(x)=x$ for $x>0$ $ReLU(x)=0$ for $x<=0$

PReLU (Parametric ReLU), a more general form of ReLU function, is defined as follows:

$pReLU(x)=x$ for $x>0$ $pReLU(x)=x/slope\_coef$ for $x<=0$

Some embodiments of the present invention do not employ a precise slope and instead only use a slope with values that are a power of two. Although such slopes can be used as an approximation of a specified slope, this approach works best, if the network is trained with the approximated PReLU function, rather than approximating the PReLU function after training.

In any case, such an approximation needs two inputs:
Coef—The logarithm of the slope coefficient
PSlope—Flag that indicates if the slope is negative or positive.
Thus, referring to FIG. 10, the PReLU function becomes:

$p\text{ReLU}(x)=x$ for $x>0$ $p\text{ReLU}(x)=x/(2^{\wedge}\text{Coef})$ for $x<=0$ and $P\text{Slope}=0$ $p\text{ReLU}(x)=-x/(2^{\wedge}\text{Coef})$ for $x<=0$ and $P\text{Slope}=1$ Looking at the approximated PReLU activation function, it will be seen that it only needs to modify the exponent of the input.

Figure 11:
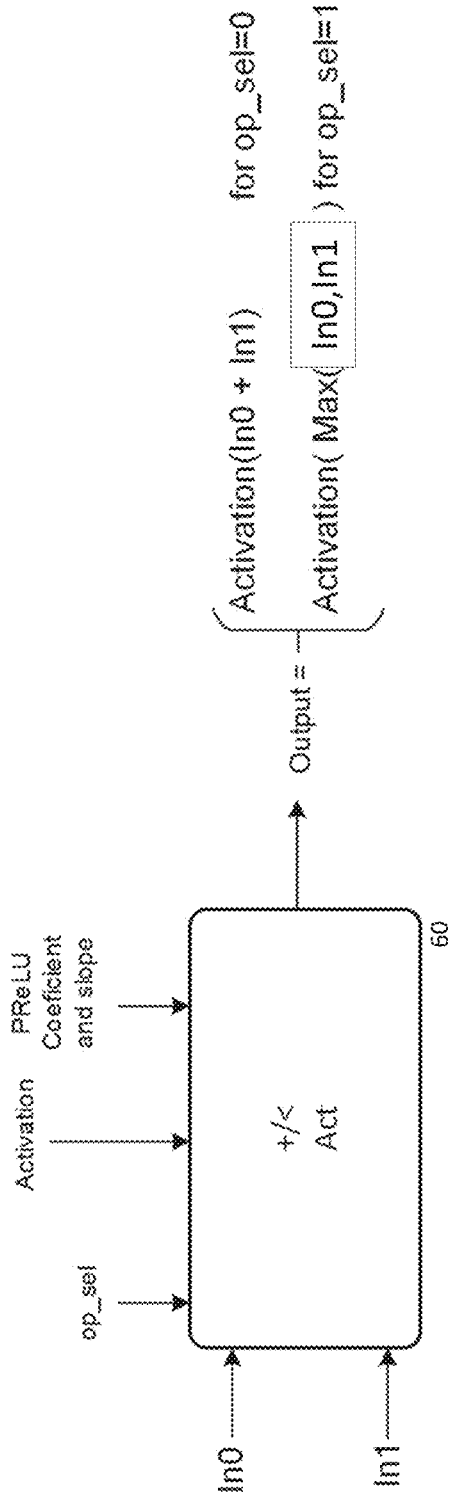
FIG. 11 shows the output module of FIGS. 6-8 with an interface for implementing the PReLU activation function of FIG. 10 in more detail.

Referring now to FIG. 11 and based on the observations and approximations discussed above, the output module 60 can implement the addition, maximum, ReLU and PReLU functions as required. The Op_sel input is used to select between the addition or maximum of the two operands In0 and In1.

The activation input can have two bits and can select between three types of activation as shown in Table 1. It will therefore be appreciated that one or more activation functions can be added, especially by increasing the number of control bits.

TABLE 1

| Activation | 0 | 0 | No Activation |
|---|---|---|---|
| | 0 | 1 | ReLU |
| | 1 | 0 | PReLU |
| | 1 | 1 | Not Supported |

For PReLU, the coefficients can be coded with 4 bits, representing the logarithm of the coefficient:

| 4 bit PReLU Coef | PReLU slope coefficient |
|---|---|
| 0000 | 1 |
| 0001 | 2 |
| 0010 | 4 |
| ... | ... |
| 1111 | 2^15 |

The output module 60 can take advantage of the floating point number pipeline with division by the power of two coefficient being done by subtracting the 4 bit PReLU coefficient instruction field value from the FP16 exponent value of the sum of In0 and In1 (or possibly the larger of the two, as will be explained below).

Using this scheme, an identity activation function can be implemented as a form of PReLU with PSlope=0 and Coef=0000, thus enabling the activation input to be defined with a single binary activation input with settings ReLU=0 or PReLU=1, so that the PReLU function shown in FIG. 10 could be modified as follows:

$p\text{ReLU}(x)=x$ for $x>0$ $p\text{ReLU}(x)=(x/(2^{\wedge}\text{Coef})$ for $x<=0$ and $P\text{Slope}=0)*\text{Activation Input}$ $p\text{ReLU}(x)=(-x/(2^{\wedge}\text{Coef})$ for $x<=0$ and $P\text{Slope}=1)$
*Activation Input, so enabling the function to be implemented in a single pipeline.

The special cases for subnormal/infinite can treated by the logic implementing the PReLU activation function in the following way:

If the input is a negative, NaN or infinite, the input value is passed to the output unchanged;
If the result is a subnormal, the result is clamped to 0.

It will be appreciated that normally, an activation function other than the identity function would only be used when processing convolution layers. However, using an output module 60 with configuration controls such as shown in FIG. 11, it would also be possible to apply a non-linear activation function to a pooling result. Although not common, this option could be useful in some situations.

Figure 12:
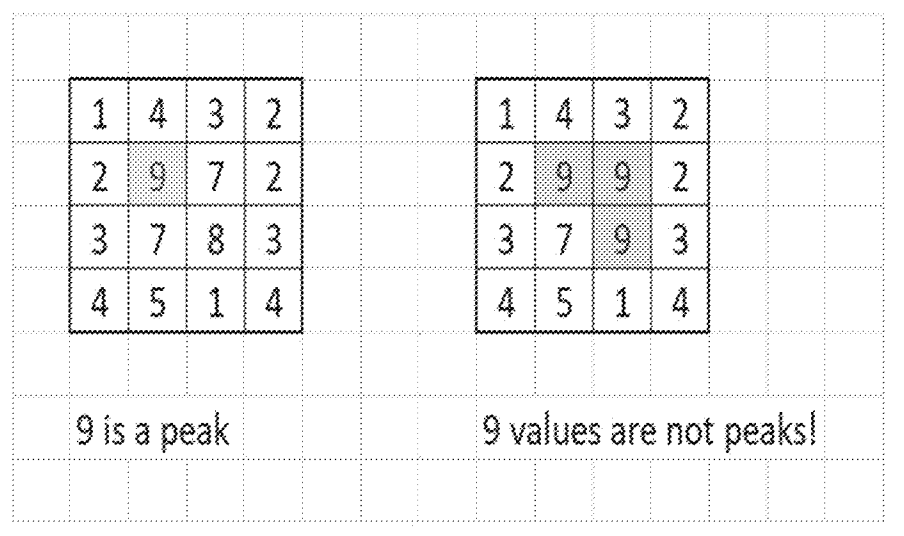

Referring now to FIG. 12, a further form of layer which can be incorporated within a network can involve detecting peaks within an image/map. A PEAK operation scans a source image/map with an M×N window, 4×4 in FIG. 12, in raster order with a given step size, for example, 1, and produces a map containing a list of the peaks found—a peak being an image/map element that is strictly greater in value than any of the surrounding elements in a window.

Figure 13:
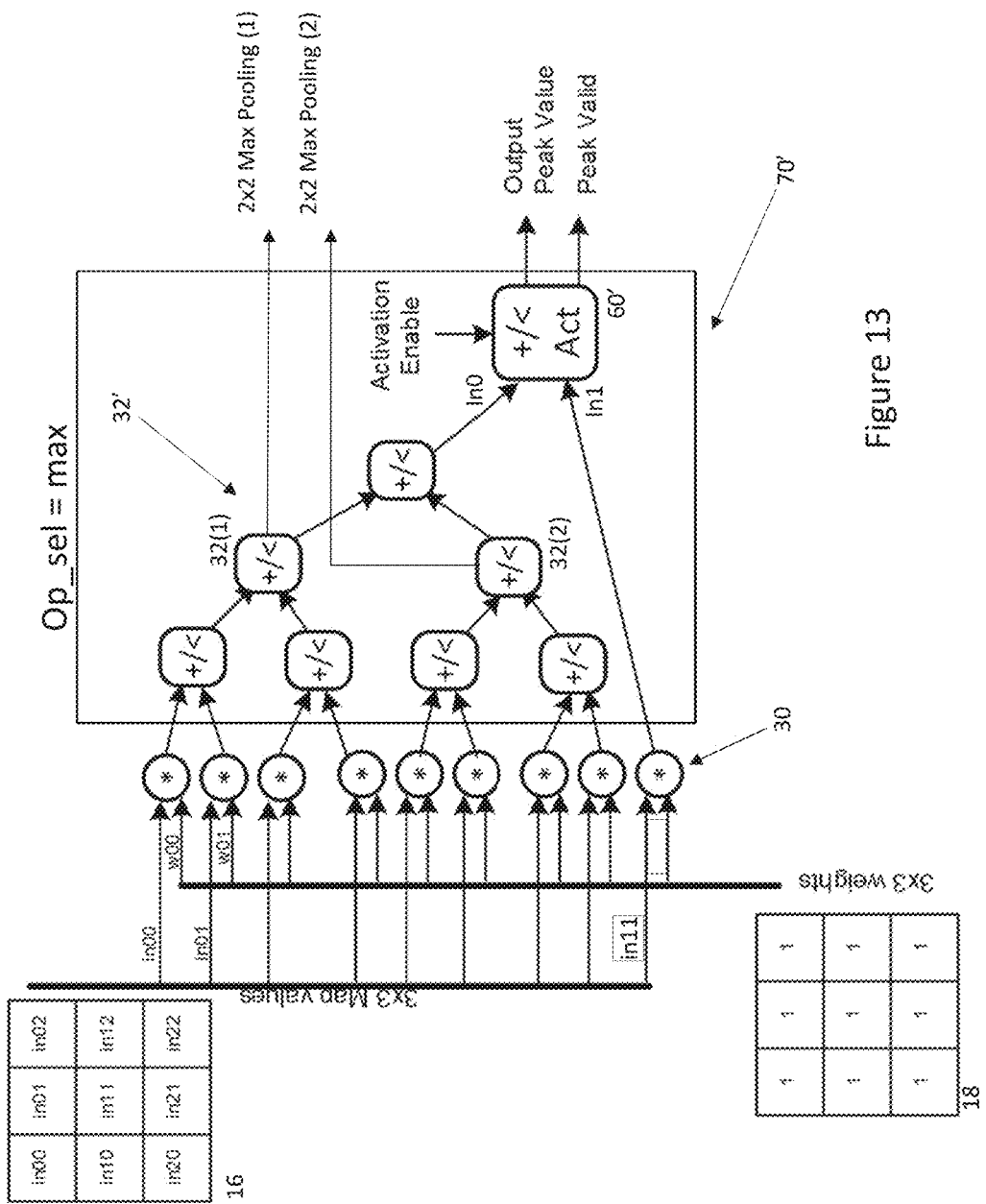
FIG. 13 shows a variant of the processing logic of FIGS. 6-8 for additionally implementing either a PEAK operation or two parallel 2×2 Max pooling operations.

Referring to FIG. 13, implementing a PEAK operation again requires the nodes of the tree 32' to be configured as comparators, as in the case of max pooling. The only condition is to have the middle element of the M×N window, corresponding to the pixel location of the image/map being processed, connected to the multiplier whose output is fed directly to In1 of the output module 60' i.e. in the example shown in FIG. 13, in11 and in22 are swapped. The output module 60' now produces two outputs, one indicating the peak value (as for max pooling) and a second output indicating if In1 is greater than In0 i.e. that In1 is a valid peak.

One way to provide this second output is for the second output to comprise a binary value indicating the maximum operand e.g. 0 for In0 or 1 for In0. Such an output could also find application for functions other than PEAK.

In a still further variant, it is also possible for the tree 32' to simultaneously provide a result of two pooling operations. In the example of FIG. 13, the tree 32' produces two 2×2 max pooling operations in parallel. In this case, the outputs are drawn from the two adders 32(1), 32(2) in the penultimate stage of the tree. These outputs could also be fed through an activation function, if required, but in any case, this can enable the step size for a pooling operation to be increased, so reducing processing time for an image/map. Again, this may require a re-organisation of the input image/map values so that the desired 2×2 sub-windows from the image values 16 are fed via the multipliers 30 to the appropriate nodes of the tree 32'.

It will also be seen that the 2×2 pooling approach shown in FIG. 13 can be adapted to provide average pooling by setting the weight values 18 to ¼ and configuring the nodes of the tree 32' for summation.

It will be appreciated that where only particular sized windows for 2D or 3D convolution or pooling were to be processed, the connections from input image/map and kernel values 16, 18 to the multipliers 30 could hardwired. However, where window sizes can vary, then especially for peak layer processing and sub-window pooling, multiplexer circuitry (not shown) would need to be interposed between the inputs 16, 18 for the engine and the multipliers 30.

The above described embodiments can be implemented with a number of variants of a basic floating point adder:
Normal FP adder used within the output module 60, 60';
FP adder with activation function used within the output module 60, 60';
Combined adder and max used within the tree 32'; and
Combined adder and max with activation function used within the output module 60, 60'.

Using these variants of adder, a common engine such as the CNN engine disclosed in PCT Application No. PCT/EP2016/081776 (Ref: FN-481-PCT) can be reconfigured for convolution, pooling or peak operations with minimal extra logic by comparison to implementing any given layer independently.

The invention claimed is:

1. A neural network engine configured to receive at least one set of values corresponding to a pixel of an input map and a corresponding set of kernel values for a neural network layer of a neural network, the neural network engine comprising:
a plurality of multipliers, each multiplier having a first operand input configured to be connected to an input map value and a second operand input configured to be connected to a corresponding kernel value; and
pairs of multipliers of the plurality of multipliers providing respective outputs to respective input nodes of a tree of nodes, each node of the tree being configured to provide an output corresponding to either:
a larger of inputs of the node; or
a sum of the inputs of the node;
wherein an output of the tree providing a first input of an output logic, and an output of one of the plurality of multipliers providing a second input of the output logic;
wherein, based at least in part on the configuration of the nodes of the tree, the output logic is configurable as a convolution layer of the neural network, an average pooling layer of the neural network, and a max pooling layer of the neural network.

2. A neural network engine according to claim 1, wherein when the neural network engine is configured as the average pooling layer of the neural network, each of the kernel values comprises a value corresponding to 1/(a window size of the set of values), the nodes of the tree are configured to sum their inputs and the output logic is configured to sum first and second inputs and to provide the sum as the output of the output logic.

3. A neural network engine according to claim 1, wherein when the neural network engine is configured as the max pooling layer of the neural network, each of the kernel values comprises a value equal to 1, the nodes of the tree are configured to output a larger of their inputs and the output logic is configured to output a larger of its first and second inputs as the output of the output logic.

4. A neural network engine according to claim 1, wherein when the neural network engine is configured as the convolution layer of the neural network, each of the kernel values comprises a trained value for the layer, the nodes of the tree are configured to sum their inputs and the output logic is configured to sum its first and second inputs, to apply an activation function to the sum and to provide an output of the activation function as an output of the output logic.

5. A neural network engine according to claim 4, wherein the activation function is one of: an identity function, a rectified linear unit function, or a parametric rectified linear unit function.

6. A neural network engine according to claim 4, wherein the activation function is defined by a binary slope parameter and a slope coefficient.

7. A neural network engine according to claim 1, wherein the neural network engine is further configured to provide a plurality of outputs from penultimate nodes of the tree when the neural network engine is configured as the average pooling layer or the max pooling layer.

8. A neural network engine according to claim 1, wherein the neural network engine is further configured to implement logic to perform at least one of:
process the convolution layer,
process the average pooling layer, or
process the max pooling layer.

9. A neural network engine according to claim 1, wherein the output logic is further configured to receive a control input value and process, based at least in part on the received control input value, at least one of:
the convolution layer,
the average pooling layer, or
the max pooling layer.

10. A device comprising:
hardware programmed to:
configure multipliers, each multiplier having a first operand input configured to be connected to an input map value and a second operand input configured to be connected to a corresponding kernel value;
provide the first operand input and the second operand input to an input node of a tree of nodes, the input node of the tree being configured to provide an output corresponding to either: a larger of the first operand input and the second operand input; or a sum of the first operand input and the second operand input;
provide an output of the tree to a first input of an output logic and provide an output of one of the multipliers to a second input of the output logic; and
based at least in part on the configuration of the input node of the tree, configure the output logic to implement at least one of:
a convolution layer of a neural network;
an average pooling layer of the neural network; or
a max pooling layer of the neural network.

11. A device according to claim 10, wherein the output logic is further configured to receive a control input value and implement, based at least in part on the received control input value, at least one of:
the convolution layer,
the average pooling layer, or
the max pooling layer.

12. A device according to claim 10, wherein when the output logic is configured to implement the convolution layer of the neural network, the nodes of the tree are configured to sum their inputs and the output logic is configured to sum its first and second inputs, to apply an activation function to the sum and to provide an output of the activation function as an output of the output logic.

13. A device according to claim 10, wherein when the output logic is configured to implement the average pooling layer of the neural network, the nodes of the tree are configured to sum their inputs and the output logic is configured to sum its first and second inputs and to provide the sum as the output of the output logic.

14. A device according to claim 10, wherein when the output logic is configured to implement the max pooling layer of the neural network, the nodes of the tree are configured to output a larger of their inputs and the output logic is configured to output a larger of its first and second inputs as the output of the output logic.

15. A method comprising:
configuring multipliers, each multiplier having a first operand input configured to be connected to an input map value and a second operand input configured to be connected to a corresponding kernel value;
providing the first operand input and the second operand input to an input node of a tree of nodes;

providing an output of the tree to a first input of an output logic;
providing one of the multipliers to a second input of the output logic; and
based at least in part on a configuration of the input node of the tree, implementing, by the output logic, at least one of:
  a convolution layer of a neural network;
  an average pooling layer of the neural network; or
  a max pooling layer of the neural network.

16. A method according to claim 15, further comprising receiving a control input and wherein implementing by the output logic is based at least in part on a value associated with the control input.

17. A method according to claim 15, wherein the input node of the tree is configured to provide an output corresponding to either: a larger of the first operand input and the second operand input; or a sum of the first operand input and the second operand input.

18. A method according to claim 15, wherein when implementing by the output logic comprises implementing the convolution layer of the neural network, the output logic comprises summing the first input and the second input of the output logic, applying an activation function to the sum and providing an output of the activation function as an output of the output logic.

19. A method according to claim 15, wherein when implementing by the output logic comprises implementing the average pooling layer of the neural network, the output logic comprises summing the first input and the second input and providing the sum as an output of the output logic.

20. A method according to claim 15, wherein when implementing by the output logic comprises implementing the max pooling layer of the neural network, the output logic comprises outputting a larger of the first input and the second input.

* * * * *